(12) United States Patent
Ou et al.

(10) Patent No.: US 11,957,162 B2
(45) Date of Patent: Apr. 16, 2024

(54) METHOD FOR MANUFACTURING A GLASS FILTER

(71) Applicant: R.Y.L. INC., Commerce, CA (US)

(72) Inventors: Suk Hwan Ou, Commerce, CA (US); Kyung Kim, Commerce, CA (US)

(73) Assignee: R.Y.L. INC., Commerce, CA (US)

( * ) Notice: Subject to any disclaimer, the term of this patent is extended or adjusted under 35 U.S.C. 154(b) by 318 days.

(21) Appl. No.: 15/930,155

(22) Filed: May 12, 2020

(65) Prior Publication Data
US 2021/0352959 A1    Nov. 18, 2021

(51) Int. Cl.
| | |
|---|---|
| *C03B 9/32* | (2006.01) |
| *A24D 3/02* | (2006.01) |
| *B21C 37/15* | (2006.01) |
| *C03B 37/012* | (2006.01) |

(52) U.S. Cl.
CPC .......... *A24D 3/0279* (2013.01); *A24D 3/0283* (2013.01); *A24D 3/0291* (2013.01); *B21C 37/156* (2013.01); *C03B 9/32* (2013.01); *C03B 37/01237* (2013.01)

(58) Field of Classification Search
CPC ........ A24D 3/0279; A24D 3/166; A24D 3/17; C03B 9/32; C03B 23/049; C03B 23/0493
See application file for complete search history.

(56) References Cited

U.S. PATENT DOCUMENTS

| | | | |
|---|---|---|---|
| 1,500,802 A | 7/1924 | Chantilis | |
| 3,236,243 A | 2/1966 | Robins | |
| 3,331,674 A * | 7/1967 | Ireland | C03B 23/049 65/276 |
| 3,723,081 A * | 3/1973 | Poulson, Jr. | C03B 23/26 65/120 |
| 4,044,936 A * | 8/1977 | Obersby | C03B 33/0955 219/121.72 |
| 4,461,308 A | 7/1984 | Le Cover | |
| 4,801,323 A * | 1/1989 | Klein | C03B 23/065 65/110 |

(Continued)

FOREIGN PATENT DOCUMENTS

EP    2380659 A1 * 10/2011    ............. B01J 19/30

OTHER PUBLICATIONS

Purr Glass, "Regular Smokey Glass Filter Tip | Review and How To by Purr", https://www.youtube.com/watch?v=_95TJbEjdF0 (Year: 2018).*

(Continued)

*Primary Examiner* — Cynthia Szewczyk
(74) *Attorney, Agent, or Firm* — WOMBLE BOND DICKINSON (US) LLP

(57) ABSTRACT

A method of manufacturing a filter that includes providing a tube having a cylindrical wall and a hollow interior. The method forms a first indentation within the tube in which a first portion of the of the cylindrical wall concaves into the hollow interior, and forms a second indentation within the tube in which a second portion of the cylindrical wall concaves into the hollow interior. The first and second indentations create 1) a first chamber and a second chamber in the tube that are separated by both indentations and 2) a path within the hollow interior formed between the first and second indentations that fluidly couples both chambers together.

15 Claims, 5 Drawing Sheets

(56) References Cited

U.S. PATENT DOCUMENTS

| | | | |
|---|---|---|---|
| 4,923,498 A * | 5/1990 | Gregory | C03B 23/045 |
| | | | 65/109 |
| 4,945,929 A | 8/1990 | Egilmex | |
| 5,178,165 A | 1/1993 | DeFelice | |
| 6,216,493 B1 * | 4/2001 | Weston | C03B 11/10 |
| | | | 65/68 |
| 2011/0036366 A1 | 2/2011 | Sebastian | |
| 2011/0094524 A1 | 4/2011 | Glover | |
| 2013/0133672 A1 | 5/2013 | Walsh | |
| 2015/0020819 A1 | 1/2015 | Barrett | |
| 2017/0208859 A1 | 7/2017 | Ou | |
| 2018/0332890 A1 | 11/2018 | Tweedie | |

OTHER PUBLICATIONS

Purr Glass, "Original Smokey Glass Filter Tip", https://purrsmoking.com/collections/glass-joint-tips/products/original-smokey-glass-filter-tip (Year: 2023).*

"Extended European Search Report with Opinion" EP Application No. 21173179.9 dated Oct. 22, 2021 (8 pages).

Office Action received for GB Patent Application No. 2106675.8, dated Nov. 9, 2021, 12 pages.

Bingo's Solutions, "How to roll a joint or a blunt with glass filter tips in 6 simple steps", Retrieved from <https://www.bingos-solutions.com/2017/01/27/how-to-roll-a-joint-or-a-blunt-with-glassfilter-tips-in-5-simple-steps/>, Jan. 27, 2017, pp. 1-29.

Examination Search Report received for Canadian Patent Application No. 3115429, dated Jul. 21, 2022, 9 pages.

Hanna, Ab, "Best Glass Tips for Smoking Marijuana", Retrieved from <https://greenrushdaily.com/technology/glass-tips-smoking-marijuana/>, Aug. 17, 2016, 5 pages.

Lowkeylegend, "Stoner Tips #160: Glass Filter Tips", Thumbnail, https://www.youtube.com/watch?v=rpbGpua7dTO, Jan. 6, 2020, 3 pages.

Office Action received for Canadian Patent Application No. 3115429, dated Jan. 3, 2023, 6 pages.

Purr Glass, "How to Blow Glass Pipes, Bongs, Bubblers, and More by Purr—Part 5", YouTube, Timestamp: (0:16-4:15), https://www.youtube.com/watch?v=l1Es2Xg-A04, Sep. 11, 2018 (Nov. 9, 2018). Copy is unavailable at the specified URL.

Wilhelm, Jeremiah, "Blunt and Joint Tips Are Becoming the Classy Way to Smoke", Retrieved from <https://www.leafly.com/news/strains-products/blunt-and-joint-tips-the-classy-way-tosmoke-cannabis>, May 30, 2017, pp. 1-2.

Non-Final Office Action for U.S. Appl. No. 17/100,694 issued Dec. 4, 2023.

* cited by examiner

US 11,957,162 B2

METHOD FOR MANUFACTURING A GLASS FILTER

FIELD

An embodiment of the disclosure relates to manufacturing a glass filter with one or more indentations. Other embodiments are also described.

BACKGROUND

Various devices exist for smoking substances such as tobacco. The most commonly used device is a cigarette or cigar, which consists of tobacco rolled within a thin paper. The cigarette or cigar is ignited at one end and smoke, which is emitted from the ignited (or smoldering) tobacco, is inhaled or tasted from the other end. In addition to cigarettes, there are tobacco pipes which are designed to hold tobacco in a bowl formed at one end and allow the user to inhale or taste smoke or vapor emitted from the burning or vaporization of the tobacco from another end. In particular, a tobacco pipe typically consists of an upwardly facing bowl for holding the tobacco, a stem (or shank) that extends from the bowl and ends in a mouth piece (the bit). Cigarettes and cigars are disposable, while most tobacco pipes are not.

SUMMARY

Many cigarettes that are smoked are machine-manufactured cigarettes that are produced by commercial brands. These cigarettes may include two parts that are rolled within the thin paper: the tobacco at one end and a cigarette filter at an opposite end. To smoke, the end having the tobacco is ignited to emit smoke. The user puts the end that has the cigarette filter to the user's lips. The user then sucks the smoke being emitted by the tobacco through the cigarette filter and into the user's mouth (and lungs). The smoke is then exhaled and the process is repeated. The cigarette filter serves several purposes. For example, filters may reduce the amount of tobacco residue made by the burning of the tobacco from being inhaled. In addition, filters provide a portion of the cigarette that users may hold while the tobacco is ignited. Also, the filter provides a path through which the smoke travels from the ignited tobacco into the user's mouth. This path may help cool the smoke before it reaches the user's lungs in order to provide a more pleasurable smoking experience.

Some cigarettes, however, may be produced without a cigarette filter. For example, users may not include a cigarette filter when hand-rolling personal cigarettes. These hand-rolled cigarettes may only include the tobacco that is rolled within the thin paper. When hand-rolling cigarettes, rather than include a filter, some users may pinch off or twist the end of the cigarette from which the user will inhale the smoke. Although this will allow the user to smoke, it lacks the benefits of having a filter, such as preventing tobacco residue from entering the user's mouth (and lungs). Therefore, there is a need for a filter with which a user may smoke a smokable substance.

The instant disclosure is directed to a process of manufacturing a filter for smoking smokable substances. The process may include providing a tube having a cylindrical wall and a hollow interior. A first indentation is formed within the tube in which a first portion of the cylindrical wall concaves into the hollow interior. In addition, a second indentation is formed within the tube in which a second portion of the cylindrical wall concaves into the hollow interior. Both of these indentations create a first chamber (e.g., a receiving chamber) that is configured to receive the smokable substance and a second chamber (e.g., a smoke chamber) that is configured to output smoke produced while the smokable substance is ignited, where both chambers are separated by the indentations. The indentations also create a path within the hollow interior formed between the two indentations that fluidly couples both chambers together. The path allows the smoke produced by the ignited substance to flow from the receiving chamber and into the smoke chamber. The manufactured filter provides the user with a reusable filter that may be used to smoke smokable substances. For example, the user may insert a hand-rolled cigarette (e.g., that does not include a filter) into the receiving chamber, and the user may inhale smoke from the smoking chamber. The indentations may filter the smoke (e.g., filter tobacco residue) before it enters the smoking chamber.

The above summary does not include an exhaustive list of all aspects of the present disclosure. It is contemplated that the disclosure includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The embodiments of the disclosure are illustrated by way of example and not by way of limitation in the figures of the accompanying drawings in which like references indicate similar elements. It should be noted that references to "an" or "one" embodiment in this disclosure are not necessarily to the same embodiment, and they mean at least one. Also, in the interest of conciseness and reducing the total number of figures, a given figure may be used to illustrate the features of more than one embodiment of the disclosure, and not all elements in the figure may be required for a given embodiment.

DETAILED DESCRIPTION

Figure 1:
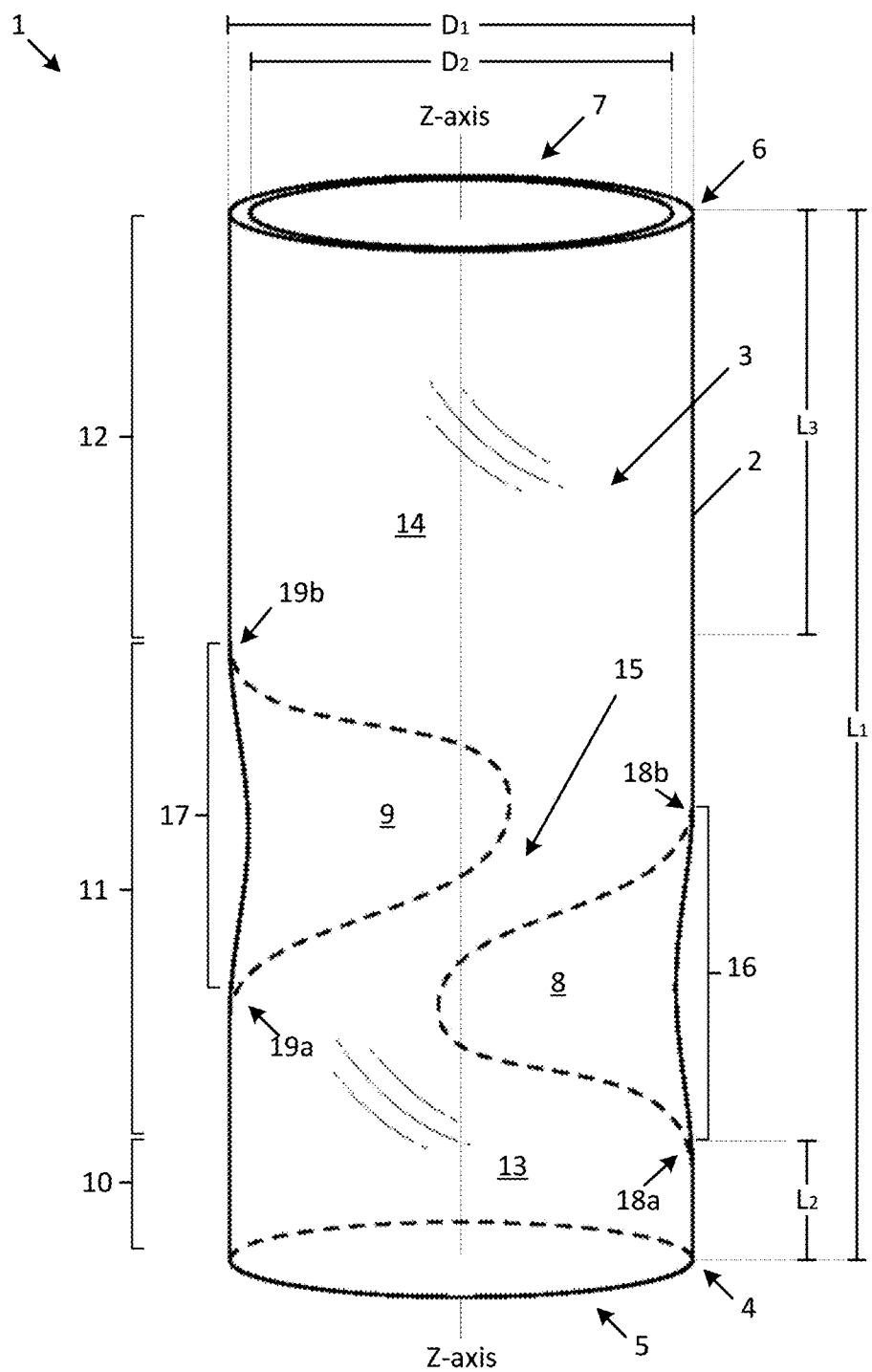
FIG. 1 shows a filter for smoking smokable substances according to an embodiment of the present disclosure.

Several embodiments of the disclosure with reference to the appended drawings are now explained. Whenever the shapes, relative positions and other aspects of the parts described in the embodiments are not explicitly defined, the scope of the disclosure is not limited only to the parts shown, which are meant merely for the purpose of illustration. Also, while numerous details are set forth, it is understood that some embodiments of the disclosure may be practiced without these details. In other instances, structures and techniques have not been shown in detail so as not to obscure the understanding of this description. Furthermore, unless the meaning is clearly to the contrary, all ranges set forth herein are deemed to be inclusive of the endpoints. In addition, the terms "over", "to", and "on" as used herein may refer to a relative position of one feature with respect to other features. One feature "over" or "on" another feature or bonded "to" another feature may be directly in contact with the other feature or may have one or more intervening layers. In addition, the use of relative terms throughout the description, such as "top", "above or "upper" and "bottom", "under" or "lower" may denote a relative position or direction. For example, a "top edge", "top end" or "top side" may be directed in a first axial direction and a "bottom edge", "bottom end" or "bottom side" may be directed in a second direction opposite to the first axial direction.

According to one embodiment, a method of manufacturing a filter comprising: providing a tube having a cylindrical wall and a hollow interior; forming a first indentation within the tube in which a first portion of the cylindrical wall concaves into the hollow interior; and forming a second indentation within the tube in which a second portion of the cylindrical wall concaves into the hollow interior, where the first and second indentations create 1) a first chamber and a second chamber in the tube that are separated by both indentations and 2) a path within the hollow interior formed between the first and second indentations that fluidly couples both chambers together.

In one embodiment, forming the first indentation comprises applying heat to the first portion of the cylindrical wall, and applying an inward pressure to the first portion of the cylindrical wall to collapse the cylindrical wall into the hollow interior. In another embodiment, the method further comprises, after forming the first indentation, rotating the tube about a longitudinal axis running through a center of the tube by a predetermined threshold. In some embodiments, the second indentation is formed after the tube has rotated about the longitudinal axis. In another embodiment, the second portion of the cylindrical wall is radially separated from the first portion of the cylindrical wall about the longitudinal axis by the predetermined threshold. In some embodiments, the predetermined threshold at which tube is rotated about the longitudinal axis is 180°.

In one embodiment, at least a portion of each of the indentations intersect a longitudinal axis running through a center of the tube. In another embodiment, the first and second portions are only partially radially aligned with one another about the longitudinal axis. In some embodiments, the method further comprises, after forming the second indentation, scoring the tube to create a scored mark along a circumference of the tube, applying heat to the scored mark, and spraying water upon the heated scored mark to separate the filter that includes the first and second indentations from the tube. In some embodiments, the filter has an end that was attached to the tube, wherein the method further comprises, after separating the filter form the tube, flame polishing the end of the filter. In another embodiment, the tube comprises an end, wherein the method further comprises, before forming the first and second indentations, flame polishing the end of the tube.

According to another embodiment, a tube filter for smoking a smokable substance comprises: a receiving section having a receiving chamber dimensioned to receive the smokable substance, a smoke section having a smoke chamber to output smoke produced while the smokable substance is ignited, wherein the smoke section has a first open end into the smoke chamber and the receiving section has a second open end into the receiving chamber that is opposite to the first end, and a first indentation and a second indentation that separates the receiving chamber from the smoke chamber, the first indentation formed from a first concave portion of a wall of the tube filter and the second indentation formed from a second concave portion of the wall of the tube filter, wherein the first concave portion and the second concave portion are only partially radially aligned about a center longitudinal axis of the tube filter with one another, wherein the first indentation and the second indentation form a path inside the tube filter that fluidly couples the receiving chamber to the smoke chamber and that runs diagonally through the center longitudinal axis of the tube filter.

In one embodiment, the first indentation is radially separated from the second indentation about the center longitudinal axis by 180°. In another embodiment, the tube filter is composed by at least one of metal and glass. In some embodiments, the tube filter has a diameter from 4 mm to 18 mm. In some embodiments, the first open end and the second open end both have an inner diameter from 3 mm to 12 mm. In one embodiment, the tube filter has a length that extends along the center longitudinal axis from 12 mm to 120 mm. In another embodiment, the first and second indentations are disposed closer to the first open end than the second open end. In some embodiments, the smoke section has a first length that extends along the center longitudinal axis and the receiving section has a second length that extends along the center longitudinal axis, wherein the first length is less than the second length. In another embodiment, the first and second open ends have raised lips that extend around a circumference of the tube filter.

FIG. 1 shows a filter for smoking smokable substances according to an embodiment of the present disclosure. Specifically, this figure illustrates a filter 1 that may be a tube (or have a substantially tubular shape) that includes a (substantially) cylindrical wall 2 with a hollow interior 3. In one embodiment, the filter may be any shape, such as cubic-shaped, cone-shaped, or sphere-shaped. The filter may be composed of at least one material, such as glass, plastic, and a metal (e.g., steel). In one embodiment, the filter may be entirely composed of a single material, such as glass.

The filter 1 includes a first (open) end 4 with a first opening 5 that opens into the hollow interior 3, and a second (open) end 6 with a second opening 7 that opens into the hollow interior. In one embodiment, the first open end 4 is opposite to the second open end 6. Thus, the hollow interior 3 fluidly couples both (openings 5 and 7 of the) ends 5 and 6 together. The filter 1 has a first (outer) diameter ($D_1$) that is the outermost diameter of the cylindrical wall 2, and a second (inner) diameter ($D_2$) that is the diameter of the hollow interior 3. In one embodiment, $D_1$ may be from about 4 mm to 18 mm. In another embodiment, $D_2$ may be from about 3 mm to 17 mm. In one embodiment, $D_2$ may be based on a thickness of the cylindrical wall 2, which may be from about 0.5 mm to 2 mm. In one embodiment, $D_2$ may be less than $D_1$ by at least double the thickness of the cylindrical wall. In another embodiment, the filter has a length ($L_1$) that extends from the first end 4 to the second end 6 along a center longitudinal axis (e.g., Z-axis) that may be from about 12 mm to 120 mm. In one embodiment, the dimensions of the filter 1 may vary, as described herein.

In one embodiment, the first end 4 and second end 6 of the filter 1 may have similar dimensions. For example, the first end 4 and the second end 6 may have a diameter of $D_1$, while their respective openings have a diameter of $D_2$. In another embodiment, the diameters of the ends may be different. For example, the outer diameter of the first end 4 may be greater than the outer diameter of the second end 6.

The filter 1 includes several sections. Specifically, the filter includes a first (e.g., smoke) section 10, an indentation section 11, and a second (e.g., receiving) section 12. The smoke section includes the first open end 4 and is adjacent to the indentation section. The receiving section includes the second open end 6 and is adjacent to the indentation section, opposite to the smoke section. Thus, the indentation section is positioned between the two sections. The receiving section also includes a receiving chamber 14 that is formed inside the hollow interior 3 and is for receiving (through the second open end 6) a smokable substance, such as tobacco. In particular, the open end 6 is fluidly coupled to the receiving chamber, where both may be dimensioned (e.g., have a diameter of $D_2$) to receive the smokable substance, such as a (e.g., personally-rolled) cigarette. Similarly, the smoke section also includes a smoke chamber 13 that is formed inside the hollow interior 3 and is for receiving smoke emitted from an ignited smokable substance. The open end 4 is fluidly coupled to the smoke chamber, where both are for outputting the smoke produced while the smokable substance is ignited. Specifically, the smoke chamber may be configured to receive the smoke (e.g., from the receiving chamber) and the open end 4 is for outputting the smoke, such as when the user inhales.

In one embodiment, the receiving section 14 and the smoke section 13 may each have a substantially tubular shape along the filter's Z-axis. For instance, the receiving section may have a same (or similar) outer diameter, such as $D_1$, and inner diameter (e.g., the diameter of the receiving chamber), such as $D_2$, throughout a length ($L_3$) of the receiving section that extends along the Z-axis from the second open end 6 to the indentation section 11. Similarly, the smoke section may have a same (or similar) outer diameter, such as $D_1$, and inner diameter (e.g., the diameter of the smoke chamber), such as $D_2$, throughout a length ($L_2$) of the smoke section that extends along the Z-axis from the first open end 4 to the indentation section. In one embodiment, the sections respective chambers have a same or similar length as the sections. For example, the receiving chamber 14 has a same or similar length $L_3$ as the receiving section.

In one embodiment, the receiving section 14 and the smoke section 13 may have different dimensions. For example, as illustrated, $L_3$ of the receiving section (and the receiving chamber) that extends along the Z-axis is greater than $L_2$ of the smoke section (and the smoke chamber) that extends along the same axis. As a result, the indentation section 11 may not be centered along $L_1$ of the filter 1. For instance, the indentation section 11 is disposed closer to the first open end 4 than the second open end 6 of the filter 1 (along the Z-axis). Specifically, a distance between the indentation section 11 and the smoke section 10 is less than a threshold distance.

The indentation section 11 includes a first indentation 8 and a second indentation 9, both of which separate the receiving chamber 14 from the smoke chamber 13. The first indentation 8 is formed from a first concave portion 16 of the cylindrical wall 2 of the filter 1, and the second indentation 9 is formed from a second concave portion 17 of the cylindrical wall 2 of the filter 1. Specifically, the concave portions are portions of the cylindrical wall 2 that concave into the hollow interior, thereby reducing the inner diameter ($D_2$) of the hollow interior. In one embodiment, the concave portions may also reduce the outer diameter ($D_1$) of the filter 1.

As illustrated, the concave portions 16 and 17 extend along different sections of the filter 1 in the Z-direction. For example, the first concave portion 16 begins to concave at a point 18a of the cylindrical wall 2 and ceases to concave at 18b. Similarly, the second concave portion 17 begins to concave at a point 19a of the cylindrical wall 2 and ceases to concave at 19b. Thus, the first concave portion 16 begins to concave (along the Z-direction) before the second concave portion and ceases to concave before the second concave portion 17 ceases. Thus, as illustrated, the first concave portion 16 and the second concave 17 are only partially radially aligned about the Z-axis of the filter 1 with one another. Specifically, a partial cross-section of the indentation section 11 (e.g., between 19a and 18b) includes at least some of both of the first concave portion 16 and the second concave portion 17, while at least one other partial cross-section of the indentation section 11 includes only has one of the first concave portion 16 and the second concave portion 17 (e.g., between 18a and 19a and between 18b and 19b). In one embodiment, both indentations are portions of the cylindrical wall that concave into the hollow interior 3, without fluidly coupling the hollow interior to an outside environment of the filter. In addition, both indentations cross through (or intersect) the center longitudinal Z-axis of the filter at least two times.

The first indentation 8 and the second indentation 9 are concave portions of the cylindrical wall 2 that form a path 15 inside the filter 1 that fluidly couples the receiving chamber 14 of the receiving section 12 to the smoke chamber 13 of the smoke section 10. In one embodiment, this path 15 has a lesser diameter than the diameter of either chamber (e.g., $D_2$). This path 15 also runs diagonally through the center longitudinal Z-axis of the filter.

In one embodiment, the filter 1 may include less or more components as described herein. For example, in one variation the filter 1 may only include one indentation (e.g., the first indentation 8), while in another variation the filter 1 may include three or more indentations. As another example, the filter may include three or more chambers inside the hollow interior 3. For instance, the filter may include a chamber that separates the first indentation 8 from the second indentation 9.

FIGS. 2-9 illustrate a process for manufacturing the filter according to one embodiment of the present disclosure. Specifically, these figures illustrate a process performed by a single machine or multiple machines to manufacture filter 1 (illustrated in FIG. 1) from a tube 20.

Figure 3:
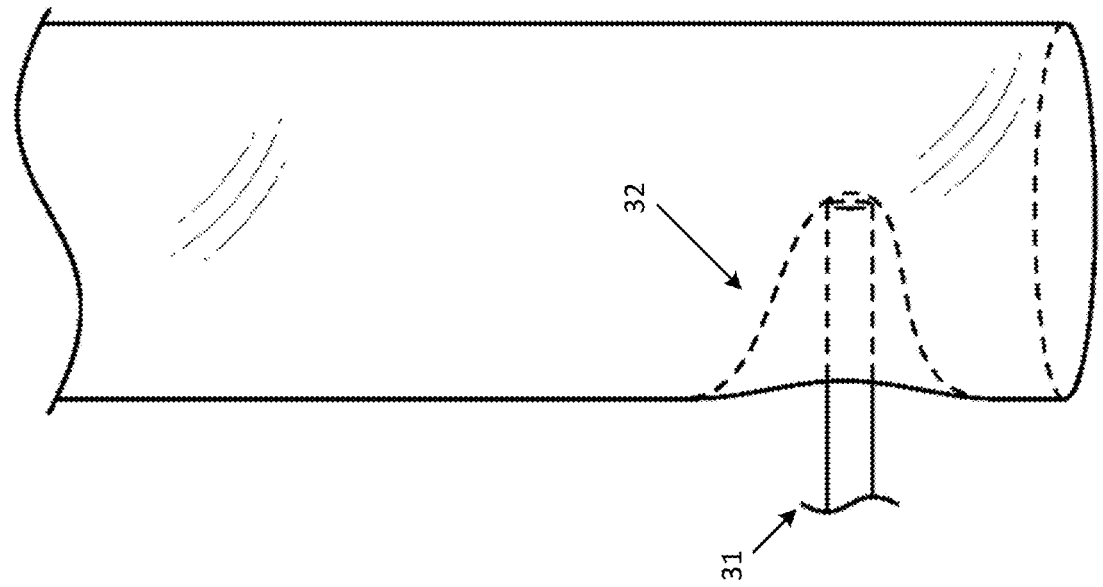
FIGS. 2-9 illustrate a process for manufacturing the filter according to one embodiment of the present disclosure.
Figure 2:
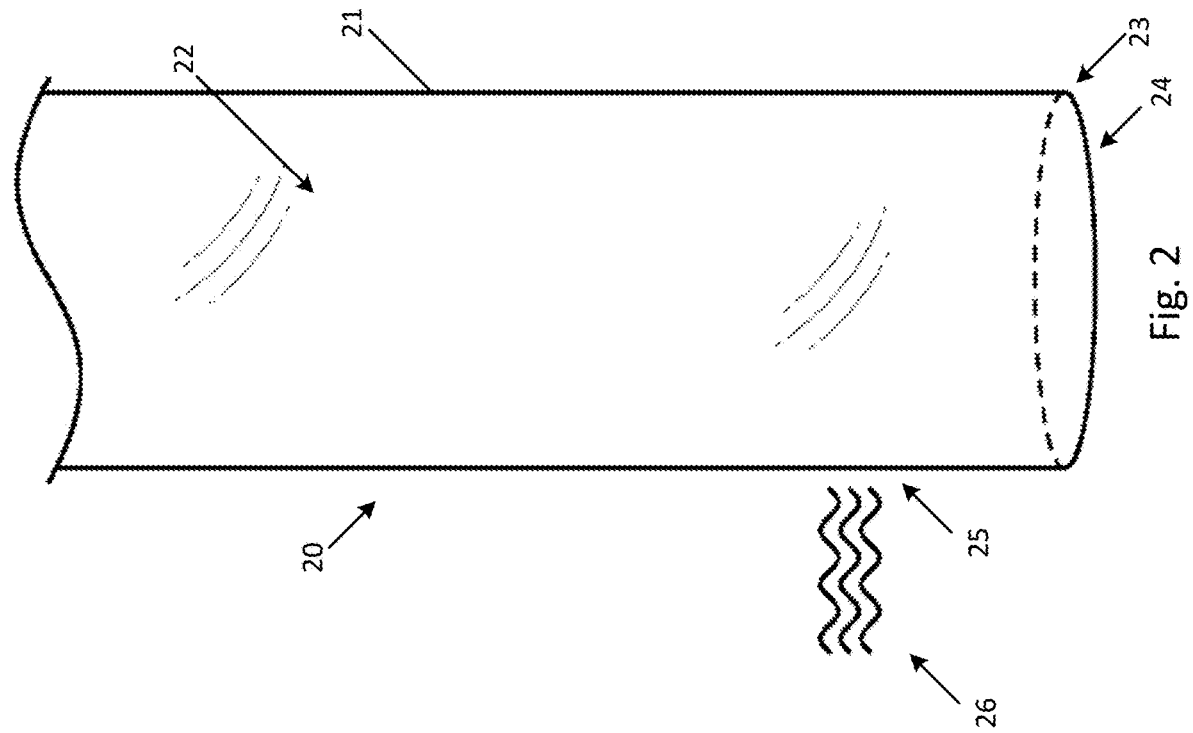

FIGS. 2 and 3 illustrate the formation of a first indentation 32. Specifically, FIG. 2 shows heat 26 being applied to a tube 20 that has a cylindrical wall 21 and a hollow interior 22. The tube 20 also as a (first open) end 23 with a (first) opening 24. As illustrated herein, heat 26 is being applied to a (first) portion of the cylindrical wall 21 of the tube 20. In one embodiment, the heat is applied to the first portion of the cylindrical wall 21 for a first period of time (e.g., four seconds). In another embodiment, the heat 26 may be applied for a period of time such that the first portion of the cylindrical wall 21 becomes amenable. In some embodiments, the heat may be a flame from a blow torch, such as a propane blow torch or a natural gas torch. FIG. 3 illustrates the tube 20 of FIG. 2 after the heat 26 is applied to the portion of the cylindrical wall. Specifically, this figure illustrates that a tool 31 is applying an inward pressure to the portion 25 of the cylindrical wall at which the heat was applied to collapse the cylindrical wall 21 into the hollow interior 22. In one embodiment, the tool 31 is a metal rod or plunger. In one embodiment, the tool 31 is a drill bit. In another embodiment, the tool 31 may apply the inward pressure a second period of time after the heat 26 was applied (e.g., two seconds). The result of the applied pressure is the formation of a first indentation 32.

Figure 4:
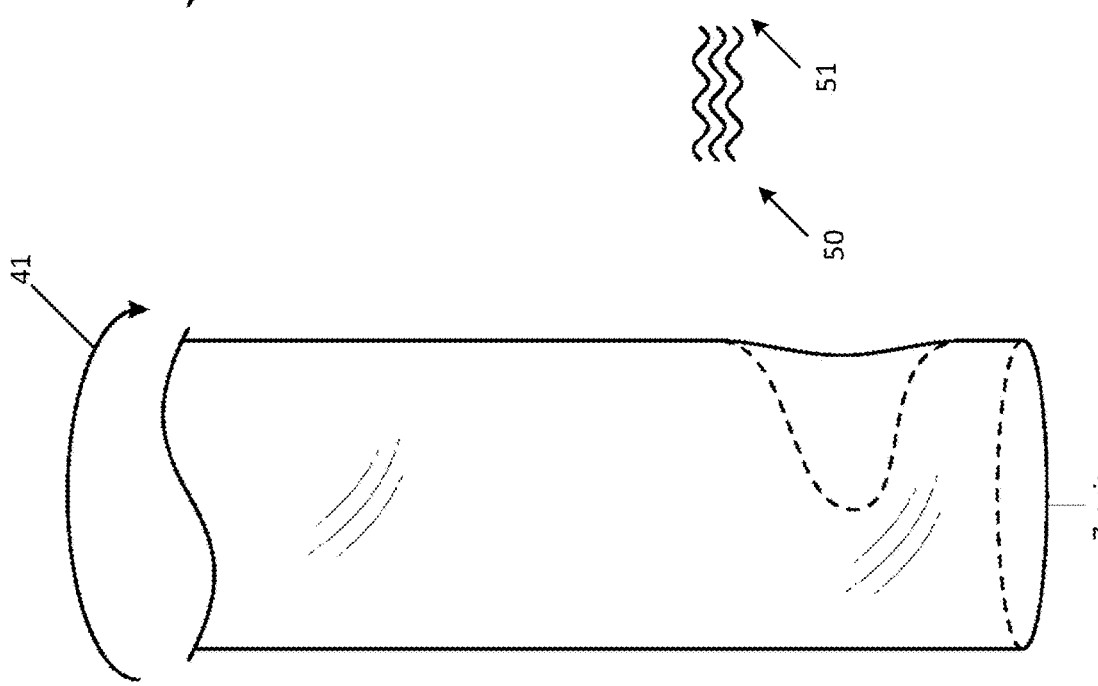

FIG. 4 illustrates the tube 20 of FIG. 3 after the first indentation 32 is formed. Specifically, this figure illustrates that the tube 20 is rotated 41 about a longitudinal Z-axis running through a center of the tube 20. In one embodiment, the tube 20 is rotated by a predetermined threshold. For example, the tube 20 may be rotated 41 about the Z-axis by 180°. This is illustrated by the first indentation 32 being located to the right of the tube 20, rather than being located to the left of the tube 20, as illustrated in FIG. 3. In one embodiment, the tube 20 may be rotated less or more than 180°, such as 135°.

Figure 6:
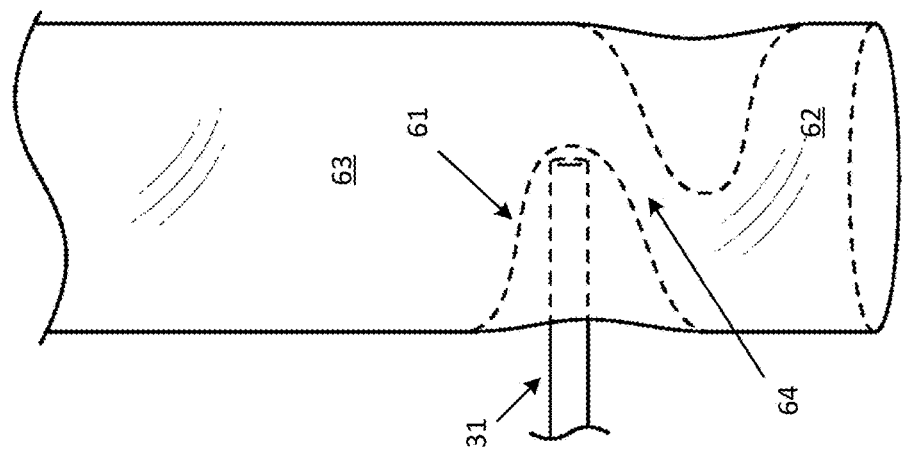
Figure 5:
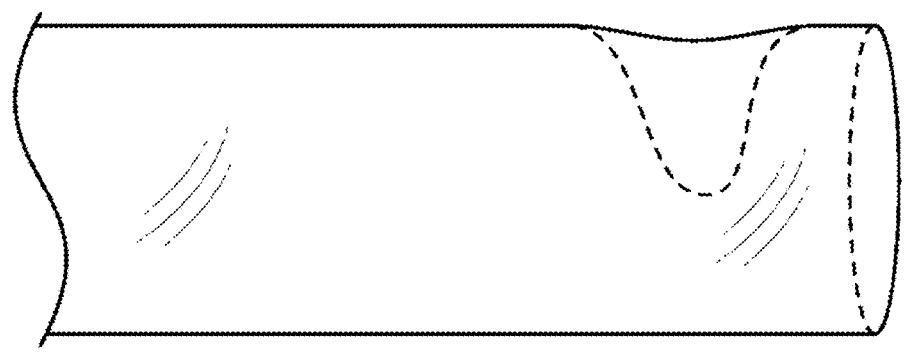

FIGS. 5 and 6 illustrate the formation of a second indentation 61. Specifically, FIG. 5 shows the tube 20 of FIG. 4, after the tube is rotated 41. In particular, this figure illustrates that heat 50 is being applied to a (second) portion 51 of the tube 20. As illustrated, the heat 50 is applied at a different point along the Z-axis than the heat 26. Specifically, the second portion 51 at which the heat 50 is applied is higher along the Z-axis (from the end 23) than the first portion 25 at which the heat 26 is applied. As a result, the first and second portions are not entirely radially aligned with one another. Also, since the tube 20 is rotated 41, the second portion 51 is radially separated from the first portion 25 by the predetermined threshold at which the tube was rotated (e.g. 180°). In one embodiment, the applied heat 50 is the same heat 26 that is applied in FIG. 2. For instance, the temperature of heat 26 (and/or duration) may be the same as heat 50. In another embodiment, heat 50 is different than heat 26. In one embodiment, the heat 50 may be applied a third period of time after the first indentation is formed in order to allow the tube to (slightly) cool. For example, the third period of time may be thirty seconds between the formation of the first indentation and a time at which the heat 50 is first applied. FIG. 6 illustrate the tube 20 of FIG. 5, after the heat 50 is applied. Specifically, this figure illustrates that the tool 31 is applying an inward pressure to the portion 51 of the cylindrical wall at which the heat was applied to collapse the cylindrical wall 21 into the hollow interior 22. The result of the applied pressure is the formation of a second indentation 61, which is therefore formed after the tube 20 has rotated about the longitudinal Z-axis, as illustrated in FIG. 4. Thus, the first indentation 32 and the second indentation 61 create 1) a first chamber 62 and a second chamber 63 in the tube 20 that are separated by both indentations and 2) a path 64 within the hollow interior 22 formed between the first and second indentations that fluidly couples both chambers together. Since the second indentation is formed after the rotation of the tube 20, the first indentation is radially separated from the second indentation about the center longitudinal axis by the predetermined threshold (e.g. 180°). In one embodiment, a same pressure is applied to the second portion 51 as the pressure that is applied to the first portion 25. As a result, the first and second indentations may have a same concave structure. In another embodiment, different pressures may be applied to the first and second portions, which may result in different concave structures for the first and second indentations. In some embodiments a different tool may be used to form the second indentation 61.

Figure 9:
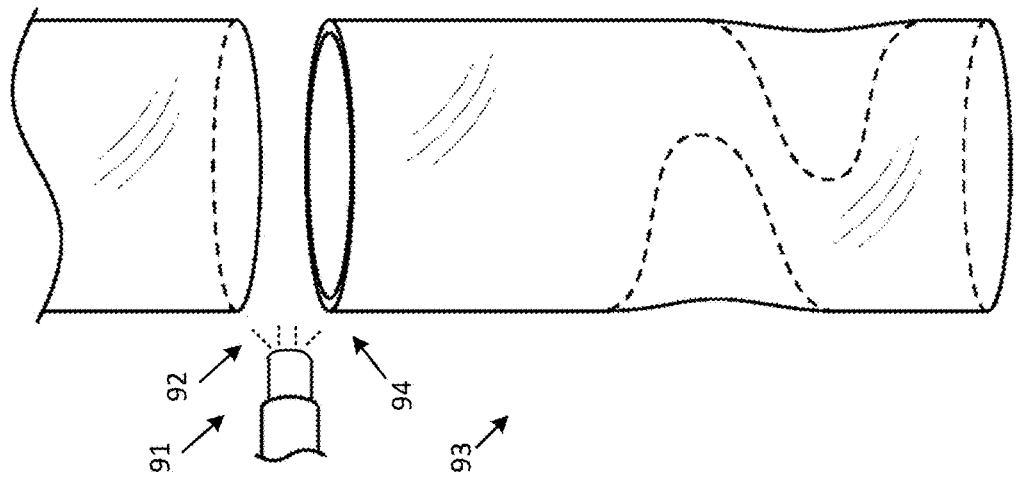
Figure 8:
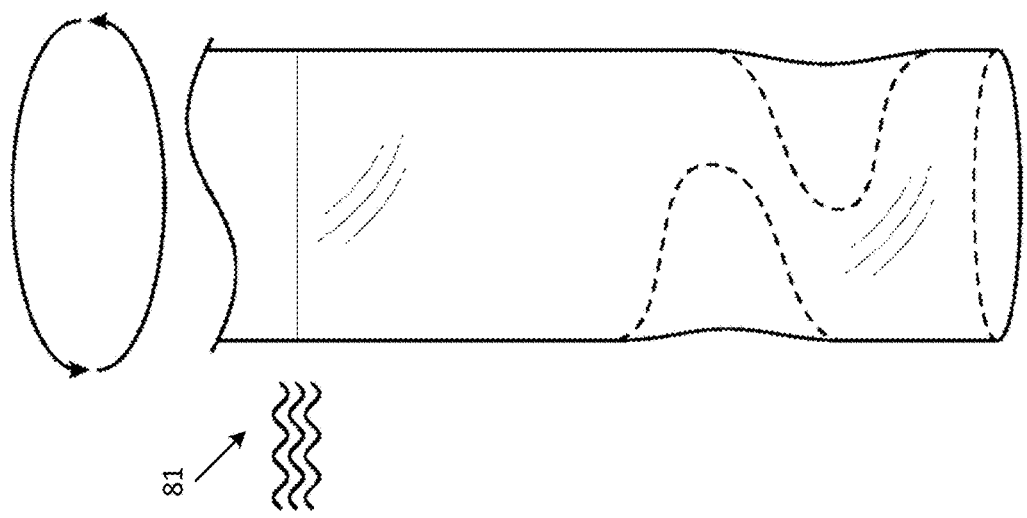
Figure 7:
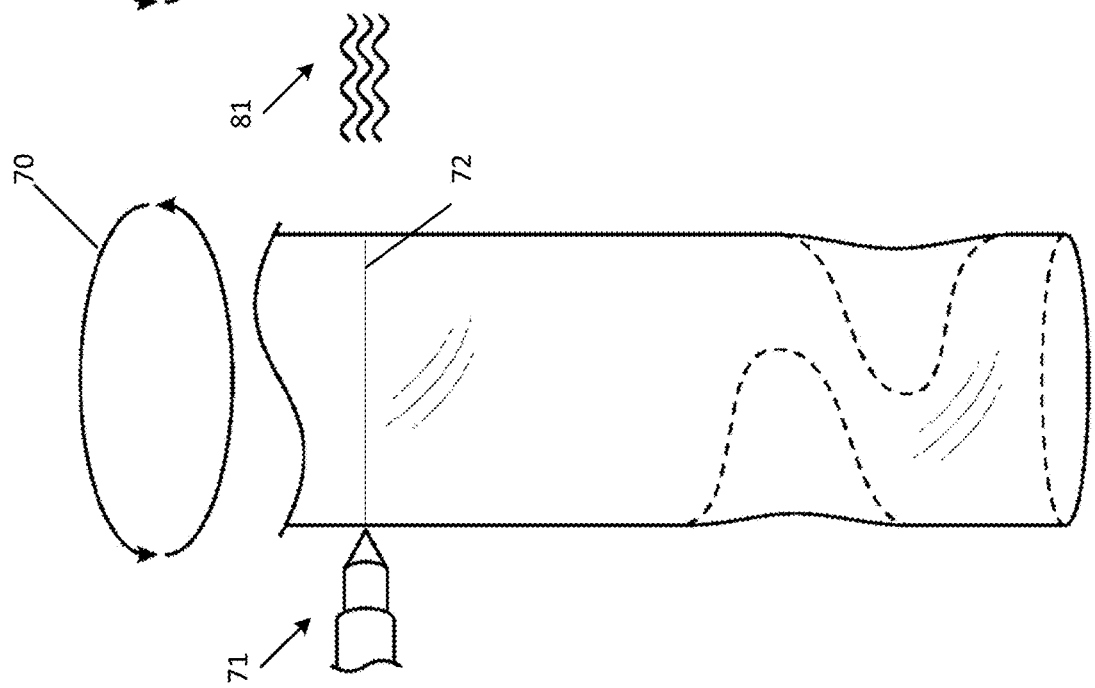

FIGS. 7-9 illustrate the separation of a tube filter from the tube 20 illustrated in FIG. 6, after the second indentation 61 is formed. Specifically, FIG. 7 shows a scoring tool 71 scoring (or cutting) the tube 20 while the tube is rotating 70, thereby creating a scored mark 73 that runs along a circumference of the tube 20. In one embodiment, the scoring tool 71 is a scoring wheel. In another embodiment, the scoring tool may be any tool that is arranged to score glass.

FIG. 8 shows that heat 81 is being applied to the score mark 72, while the tube rotates. As described herein, the heat 81 may be the same (similar) or different than at least one of the other heats (e.g., heat 26 and 51) that are applied to the tube 20. For instance, the heat 81 may be applied for a fourth period of time (e.g., four seconds). As described herein, the heat 81 is applied while the tube 20 rotates. In one embodiment, the tube 20 may be rotated at a similar speed as when the tube was scored (as described in FIG. 7), or the heat may be applied while the tube is rotating at a different speed. In one embodiment, the tube 20 is being rotated in order to apply the heat 81 evenly along the scored mark.

FIG. 9 shows the tube 20 being cut due to thermal shock. Specifically, this figure shows a spray nozzle 91 that is spraying a liquid 92 (e.g., water) upon the heated score mark 72. The sprayed liquid thermally shocks the tube 20, causing a portion 93 of the tube to separate from (a remainder of) the tube 20. This portion 93 is a filter, which includes the first indentation 32 and the second indentation 61, as described herein. In one embodiment, the filter 93 may be separated (or cut) while the tube 20 continues to rotate. In another embodiment, the filter 93 is the same as filter 1 illustrated in FIG. 1.

In one embodiment, the tube 20 may be allowed to cool after the formation of the second indentation 61. Specifically, the heat 81 may be applied after a sixth period of time (e.g., one minute) from which the second indentation 61 is formed.

Figure 10:
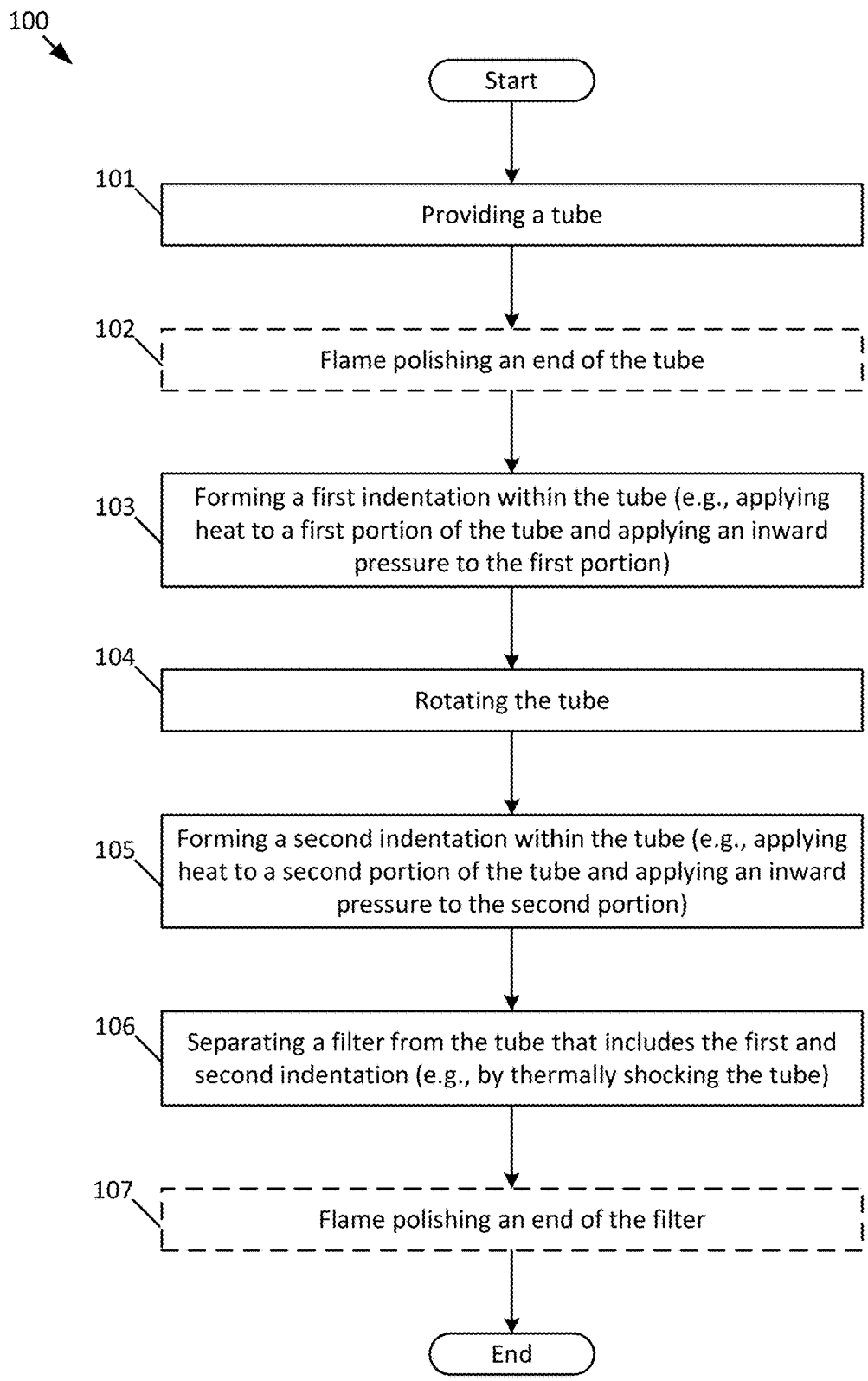
FIG. 10 is a flowchart of one embodiment of the process for manufacturing the filter.

FIG. 10 is a flowchart of one embodiment of a process 100 for manufacturing a filter (e.g., filter 1 of FIG. 1 and/or filter 93 of FIG. 9). This figure will be described with reference to FIGS. 1-9. The process 100 begins by providing a tube, such as tube 20 that includes a cylindrical wall 21 and a hollow interior 22 (at block 101). The process 100 flame polishes an end of the tube (at block 102). For example, the end 23 of tube 20 is flame polished. In one embodiment, the end 23 may be flame polished before any indentations are formed within the tube 20. In another embodiment, the end may be flame polished after at least one indentation is formed. In some embodiments, flame polishing includes applying a heat to the end, while the tube 20 is rotating. In one embodiment, this process may be performed one or more times. For example, heat may be applied while the tube 20 is rotating for a period of time (e.g., five seconds). In one embodiment, the heat may be applied by a flame (produced by a torch), while the tube is rotating. The heat may then be removed for a period of time (e.g., two seconds). Then, heat may be again applied while the tube 20 is rotating for a third period of time (e.g., five seconds). In one embodiment, the second application of heat may be hotter (e.g., having a higher temperature) than the heat of the first application. In one embodiment, the period of times may be the same or different. As a result of the flame polishing, a raised lip that extends around a circumference of the filter 1 and may be formed at the end 23 of the tube 20, which may have an outer diameter that is greater than an outer diameter of (the cylindrical wall 21 of) the tube 20.

The process 100 forms a first indentation within the tube 20 in which a first portion of the cylindrical wall concaves into the hollow interior. Specifically, the first indentation is formed by applying heat to the first portion of the tube and applying an inward pressure to the first portion (at block 103). The process 100 rotates the tube 20 (at block 104). The process 100 forms a second indentation within the tube 20 in which a second portion of the cylindrical wall concaves into the hollow interior. In particular, the second indentation is formed by applying heat to the second portion of the tube and applying an inward pressure to the second portion (at block 105). The process 106 separates the filter (e.g., 93) from the tube 20 that includes the first and second indentations by scoring the tube to produce a scored mark on the tube, applying heat upon the scored mark, and then thermally shocking the tube by spraying water upon the heated scored mark, which causes the filter to separate from the tube (at block 106). The process 100 flame polishes an end of the filter (block 107). For example, as illustrated in FIG. 9, the filter 93 has an end 94 that was attached to tube 20, before the tube was thermally shocked, thereby cutting off the filter. In one embodiment, this end 94 may be flame polished in a similar fashion to the end 23 as described in block 102.

Some embodiments perform variations of the process 100 described in FIG. 10. For example, the specific operations of at least some of the processes may not be performed in the exact order shown and described. The specific operations may not be performed in one continuous series of operations and different specific operations may be performed in different embodiments. For instance, the first and second indentations may be performed in any order (e.g., the first indentation being performed before the second indentation or vice a versa). In some embodiments, at least some of the operations described herein are optional. For example, the operations contained in dashed blocks (e.g., blocks 102 and 107) may not be performed.

As previously explained, an embodiment of the disclosure may be a non-transitory machine-readable medium (such as microelectronic memory) having stored thereon instructions, which program one or more data processing components (generically referred to here as a "processor") to perform the glass manufacturing operations of a vial manufacturing process. For instance, each of the processing operations disclosed herein may be performed by a single machine or a combination of machines, such that each of the steps are considered automated and capable of being performed without user intervention. In other embodiments, some of these operations might be performed by specific hardware components that contain hardwired logic. Those operations might alternatively be performed by any combination of programmed data processing components and fixed hardwired circuit components.

While certain embodiments have been described and shown in the accompanying drawings, it is to be understood that such embodiments are merely illustrative of and not restrictive on the broad disclosure, and that the disclosure is not limited to the specific constructions and arrangements shown and described, since various other modifications may occur to those of ordinary skill in the art.

In some embodiments, this disclosure may include the language, for example, "at least one of [element A] and [element B]." This language may refer to one or more of the elements. For example, "at least one of A and B" may refer to "A," "B," or "A and B." Specifically, "at least one of A and B" may refer to "at least one of A and at least one of B," or "at least of either A or B." In some embodiments, this disclosure may include the language, for example, "[element A], [element B], and/or [element C]." This language may refer to either of the elements or any combination thereof. For instance, "A, B, and/or C" may refer to "A," "B," "C," "A and B," "A and C," "B and C," or "A, B, and C."

What is claimed is:

1. A method of manufacturing a filter comprising:
   providing a tube having a cylindrical wall and a hollow interior;
   forming a first indentation within the tube in which a first portion of the cylindrical wall concaves into the hollow interior by applying heat to the first portion of the cylindrical wall and applying an inward pressure to the first portion of the cylindrical wall to collapse the first portion of the cylindrical wall into the hollow interior;
   after forming the first indentation, rotating the tube about a longitudinal axis running through a center of the tube by a predetermined threshold; and
   after said rotating, forming a second indentation within the tube in which a second portion of the cylindrical wall concaves into the hollow interior by applying heat to the second portion of the cylindrical wall and applying an inward pressure to the second portion of the cylindrical wall to collapse the second portion of the cylindrical wall into the hollow interior;
   wherein the second portion of the cylindrical wall is radially separated from the first portion of the cylindrical wall about the longitudinal axis by the predetermined threshold, and the heat applied to the second portion is separate along the longitudinal axis from where the heat was applied to the first portion, and the first and second indentations are separated longitudinally; and
   the first and second indentations create 1) a first chamber and a second chamber in the tube that are separated by both indentations and 2) a path within the hollow interior formed between the first and second indentations that fluidly couples both chambers together, wherein the path runs diagonally through the longitudinal axis of the filter.

2. The method of claim 1, wherein the predetermined threshold at which tube is rotated about the longitudinal axis is 180°.

3. The method of claim 1, wherein at least a portion of each of the indentations intersect a longitudinal axis running through a center of the tube.

4. The method of claim 3, wherein the first and second portions are only partially radially aligned with one another about the longitudinal axis.

5. The method of claim 1 further comprising, after forming the second indentation,
   scoring the tube to create a scored mark along a circumference of the tube;
   applying heat to the scored mark;
   spraying water upon the heated scored mark to separate the filter that includes the first and second indentations from the tube.

6. The method of claim 5, wherein the filter has an end that was attached to the tube, wherein the method further comprises, after separating the filter form the tube, flame polishing the end of the filter.

7. The method of claim 1, wherein the tube comprises an end, wherein the method further comprises, before forming the first and second indentations, flame polishing the end of the tube.

8. The method of claim 1, wherein the inward pressure is applied to the first portion of the cylindrical wall after a period of time from which the heat was applied.

9. The method of claim 1, wherein the second heat is the same as the first heat.

10. The method of claim 1, wherein the second indentation is formed a period of time after the first indentation is formed.

11. The method of claim 1, wherein the tube comprises at least one of metal and glass.

12. The method of claim 1, wherein the tube has a diameter from 4 mm to 18 mm.

13. The method of claim 1, wherein the filter comprises a first open end that opens into the first chamber and a second open end that is opposite to the first open end and opens into the second chamber.

14. The method of claim 13, wherein the first open end and the second open end both have an inner diameter from 3 mm to 12 mm.

15. The method of claim 13, wherein the filter has a length that extends between the first and second open ends and along a center longitudinal axis from 12 mm to 120 mm.

\* \* \* \* \*